INVENTOR
KEITO NAKAZAWA
By Linton and Linton
ATTORNEYS

INVENTOR
KEITO NAKAZAWA
By Linton and Linton
ATTORNEYS

KEITO NAKAZAWA INVENTOR
By Linton and Linton
ATTORNEYS

INVENTOR
KEITO NAKAZAWA
By Linton and Linton
ATTORNEYS

{a~f Odd-Number Field Vertical Sync Signal
{a'~f' Even-Number Field Vertical Sync Signal INVENTOR
KEITO NAKAZAWA
By Linton and Linton
ATTORNEYS INVENTOR
KEITO NAKAZAWA
By Linton and Linton
ATTORNEYS INVENTOR
KEITO NAKAZAWA
By Linton and Linton
ATTORNEYS INVENTOR
KEITO NAKAZAWA
By Linton and Linton
ATTORNEYS April 1, 1969 KEITO NAKAZAWA 3,436,469

METHOD FOR SYNCHRONIZING COLOR TELEVISION SIGNALS

Filed Oct. 12, 1965 Sheet 9 of 9

INVENTOR
KEITO NAKAZAWA
By Linton and Linton
ATTORNEYS

United States Patent Office 3,436,469
Patented Apr. 1, 1969

3,436,469
METHOD FOR SYNCHRONIZING COLOR TELEVISION SIGNALS

Keito Nakazawa, Kawasaki-shi, Japan, assignor to The General Corporation, Kawasaki-shi, Kanagawa-ken, Japan Filed Oct. 12, 1965, Ser. No. 495,092
Claims priority, application Japan, Oct. 13, 1964, 39/57,948
Int. Cl. H04n *1/46, 9/02*
U.S. Cl. 178—5.2 3 Claims

ABSTRACT OF THE DISCLOSURE

The present invention relates to synchronizing the primary colors in a line sequential color television system. The color synchronizing signal of the present invention is the same as the synchronizing signal often used in black and white television. A pulse signal is sampled corresponding to the leading edge of a vertical synchronizing pulse. A color switching circuit produces a three stepped waveform of each color sequentially and means is provided for shifting the three stepped waveform to change the color switching sequence. A bi-stable multivibrator may be used to sample the pulse signal corresponding to the leading edge of a vertical synchronizing pulse in an even number field. A mono-stable multivibrator may be used to increase the pulse width of a horizontal synchronizing pulse of an odd number field.

This present invention relates to a method for effecting the synchronization of color television signals received on a line-sequential color image reproducing apparatus.

It has been proposed to translate a composite color video signal commonly known as the NTSC signal or the SECAM signal into a line-sequential signal for transmission to a line-sequential type of color television receiver or for recording on a magnetic tape. The NTSC signal or the SECAM signal thus translated in a line-sequential type of signal is substantially of the same character as a monochrome signal and can be handled practically in the same manner as the latter.

Such signal translation has made it possible to utilize a closed circuit type magnetic recording apparatus for the recording and reproduction of a composite color video signal.

In the line-sequential signal transmission method to which the present invention has reference, the signals representing the so-called three primary colors—red, green and blue—are transmitted each on a sepecific scanning line and the transmission of the three colors is completed with corresponding three scanning lines, it follows that if the sequence of color signal transmission is given, say in the order of red, green, blue, red, green, blue and so on, and the scanning line for carrying a specific color signal, say for example, a red color signal, is predetermined, it becomes possible to accomplish the synchronization of the individual color signals at the transmitter with those at the receiver or those at the time of recording with those at the time of the reproduction. To specify this particular scanning line, there has hitherto been employed a method in which a color instruction or index signal is inserted at the back porch of the initial horizontal flyback signal carrying a red color on transmission and is separated therefrom on reception thereby obtaining the red color signal.

However, this prior-art method has the disadvantage that the color index signal inserted during the horizontal flyback intervals tends to appear on the reproduce image screen at the receiver, or the color index signal superimposed upon the composite video signal is caused to blank out on passage through the clamp circuits in the transmitter or those in the magnetic recorder.

It is the primary object of this present invention to provide new and useful means of effecting the synchronization of primary color signals at the transmitter and at the receiver which will eliminate the above noted difficulties.

It is another object of the present invention to provide an improved method for color signal synchronization utilizing a vertical synchronizing signal to index the position of one of the three primary colors transmitted on a specific scanning line without use of the conventional color index signals.

These objects and other features of the present invention will become apparent from the following description taken in connection with the accompanying drawings in which:

FIG. 1 is a waveform diagram illustrating the composite synchronizing signal;

FIG. 2 schematically illustrates the scanning lines on which the primary color signals are transmitted, the solid lines representing an odd-number field and the dotted lines representing an even-number field;

Figure 3:
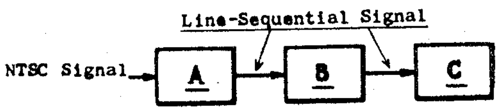
FIG. 3 is a block diagram illustrating a transducer unit or converter, a magnetic recording and reproducing unit, and a monitoring unit or line-sequential television receiver.
Figure 6:
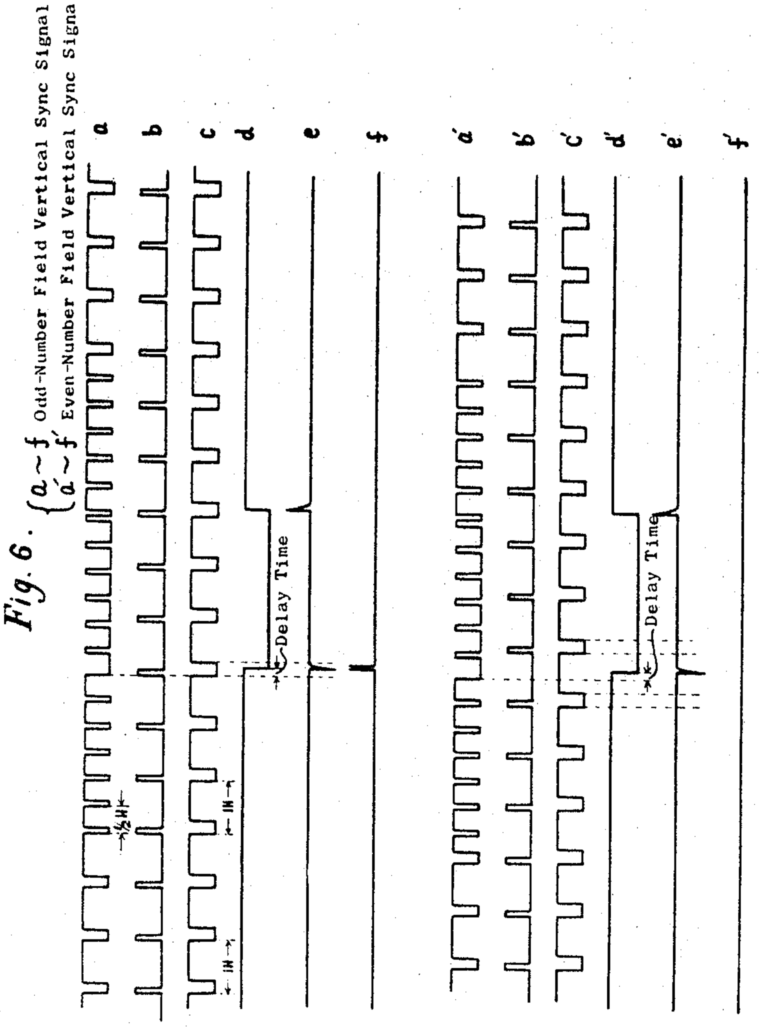
Figure 7:
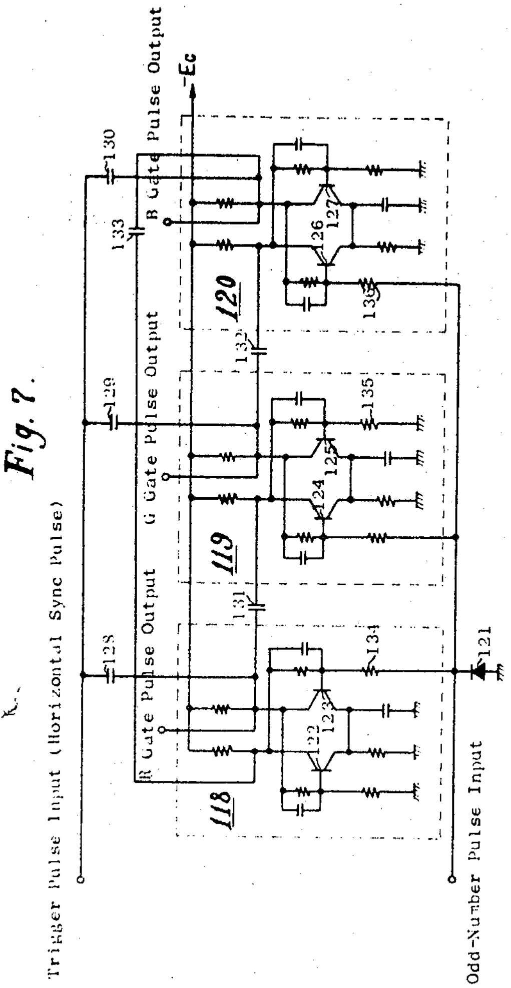
Figure 8:
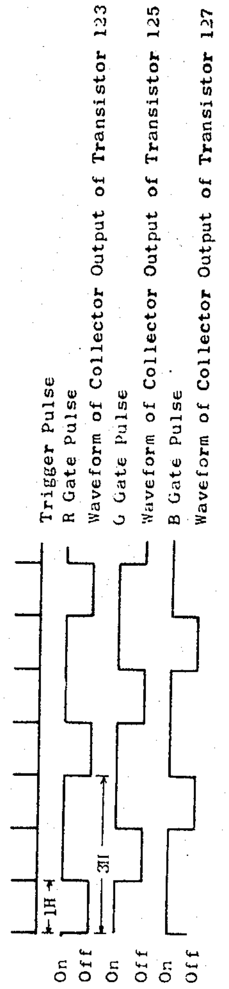
Figure 9:
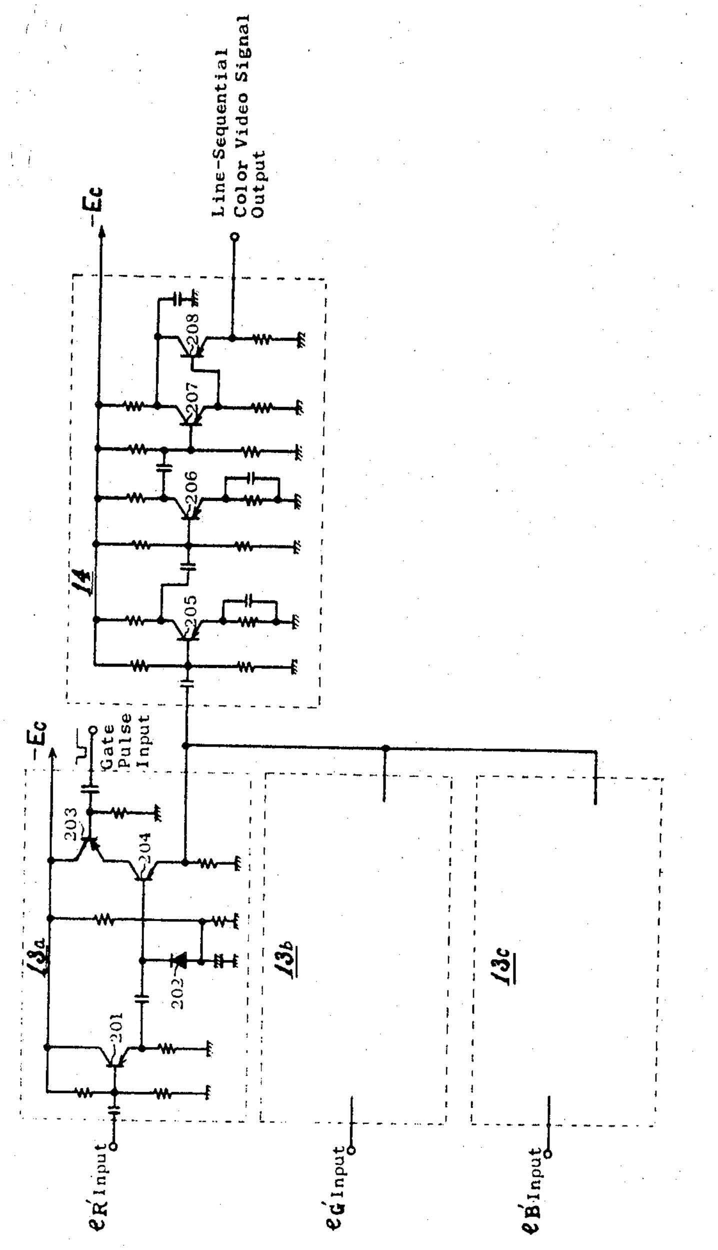
Figure 10:
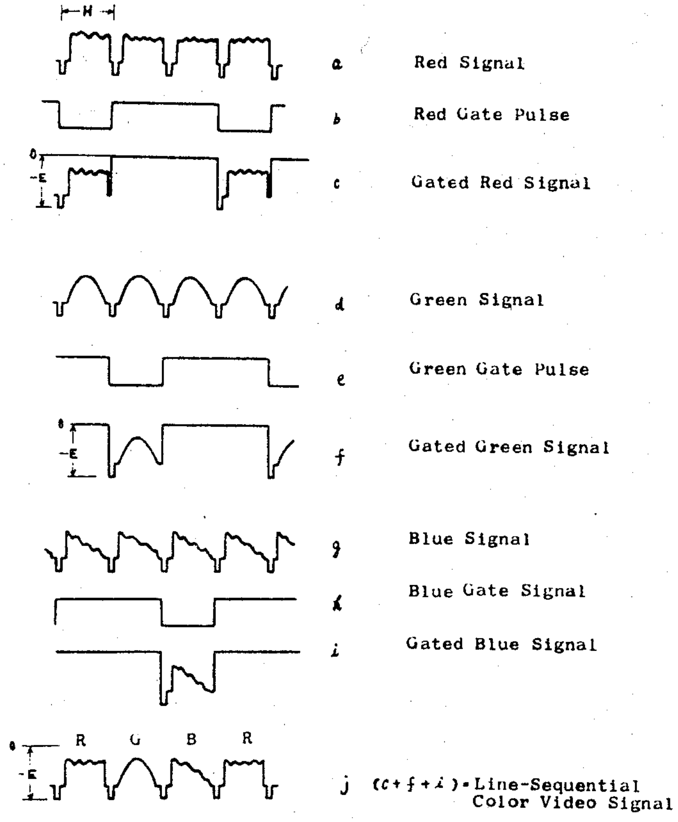
Figure 11:
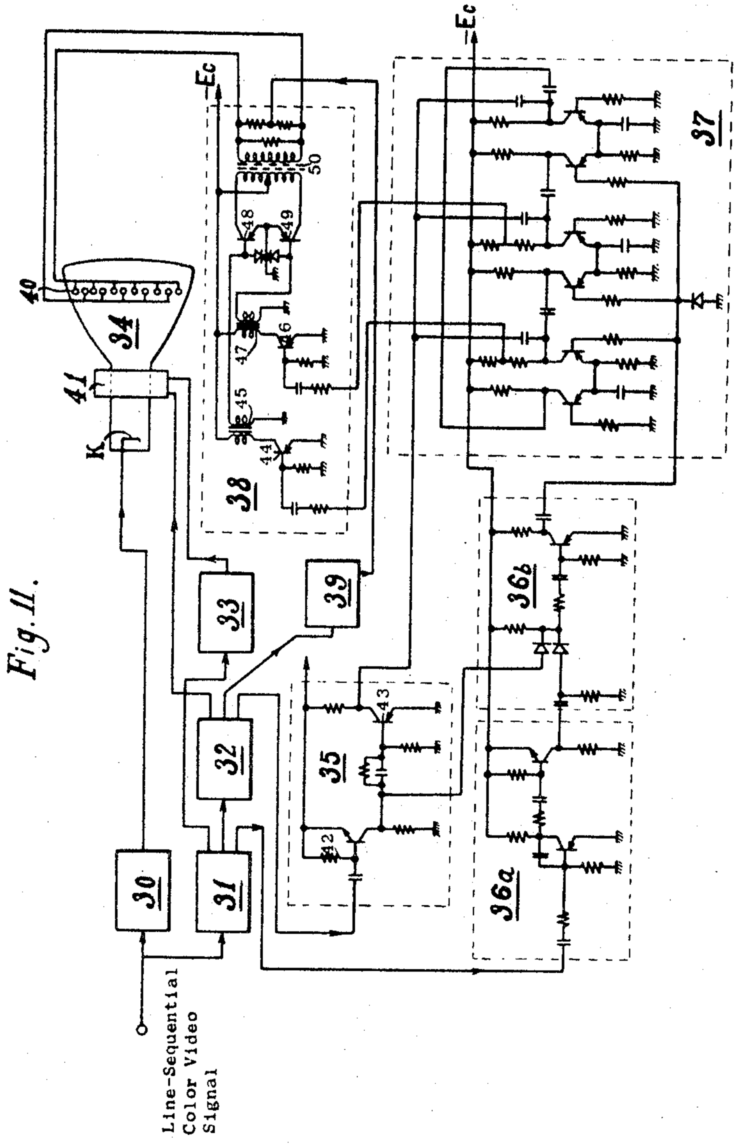

FIG. 6*aa'–ff'*, inclusive, illustrate the waveforms of pulses apeparing in the various circuits;

FIG. 7 is a circuit diagram illustrating a ring counter;

FIG. 8 is a waveform diagram illustrating the collector outputs of the transistor flip-flop circuits;

FIG. 9 is a circuit diagram illustrating a gate circuit and an output amplifier as used, FIG. 10*a–j*, inclusive, illustrate the waveforms of the primary color signals, and FIG. 11 schematically illustrates the monitor or television receiver of FIG. 3.

According to the method of the present invention, the line-sequential video signal free of color index signals is electrically identical with the usual black-white video signal, and hence can be readily used for existing monochrome transmitters or magnetic recording and reproducing apparatus.

To make the basic concept of the present invention better understood, a description will be first rendered of the synchronizing signal which is utilized in the method of synchronizing the primary color signals according to the present invention.

Figure 1:
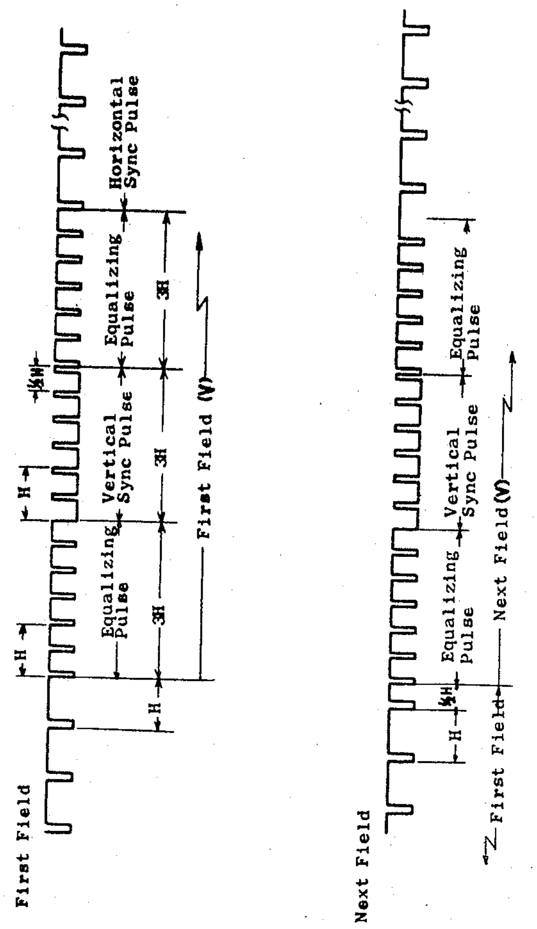

The synchronizing signal, as is well known, comprises a horizontal synchronizing pulse, an equalizing pulse and a vertical synchronizing pulse, and has the kind of typical waveform as shown in FIG. 1. The term H denotes the time interval from the beginning of one scanning line to the beginning of the next scanning line. The term V denotes the time interval from the beginning of one field to the beginning of the next field. It may be added that a first field and the next field form one frame having a total of 525 scanning lines because of the use of 2:1 interlaced scanning. This is known to be common in the standard television system both in the United States of America and Japan.

As the third field and the fourth field form another frame of picture, so the subsequent odd-number and even-number pairs of fields form successive frames. The difference between odd-number fields and even-number fields is that the vertical synchronizing pulse is in phase with or shifted ½ H from the horizontal synchronizing pulse. It is thus obvious that the leading edge of the vertical synchronizing pulse in an even-number field is situated at 525/2=262.5, i.e. the midpart of the 263rd scanning line.

Figure 2:
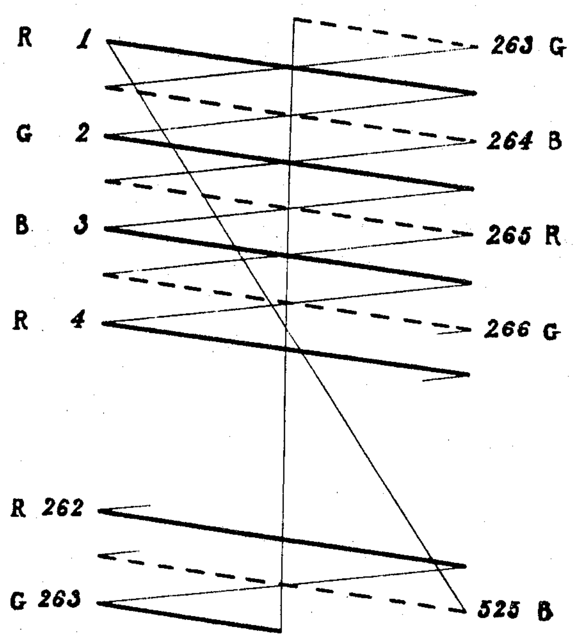

The relations between the vertical synchronizing signal and the three primary color signals will be discussed in connection with the line diagram of FIG. 2. It will be understood from this illustration that as the color signals are allocated for transmission in the sequence of red, green, blue and so on starting with the first scanning line, the green color signal happens to position on the 263rd scanning line and the blue color signal on the 525th scanning line. Again, the first scanning line in the next frame turns to represent the red color, thus repeating the sequence of corespondence of each primary color with determinate scanning line during each frame cycle. This means that it suffices to index an *n*-scanning line once for each frame without having to superimpose a color index signal for every three scanning lines. With the sequence of red, green and blue set in that order and the first scanning line specified for red, the 263rd scanning line and the 525th scanning line are invariably green and blue, respectively, provided that there has been no circuit malfunction. In the event that there should occur some malfunction of the circuits after the first scanning line in one frame is specified for indexing the red color and such circuit mal-function should continue until the red color signal is indexed by the first scanning line in the next frame, it will be appreciated that normal circuit operations would resume with the next color index signal only after one thirtieth of a second which is the duration of one frame. Therefore, circuit mal-functioning due to noise or other trouble of such limited duration can be considered negligible for all practical purposes.

The present invention will be described more fully in connection with a preferred embodiment thereof in which the leading edge of a vertical synchronizing pulse in an odd-number field is derived from the vertical synchronizing signal to be utilized as an index for the first scanning line. It is to be noted, however, that similar results may be obtained by deriving the leading edge of a vertical synchronizing pulse in an even-number field for application to the 263rd scanning line.

Reference is now had to FIG. 3 which shows a transducer unit or converter A adapted to translate the NTSC signal or the like into a line-sequential color image signal having its red color component indexed at the first scanning line by a vertical synchronizing pulse of an odd-number field. The line-sequential signal thereby obtained is recorded at a magnetic recording unit B and reproduced at a line-sequential type television receiver C wherein the vertical synchronizing pulse is detected thereby obtaining a desired color image with its color components correctly synchronized.

*Transducer unit*

Figure 4:
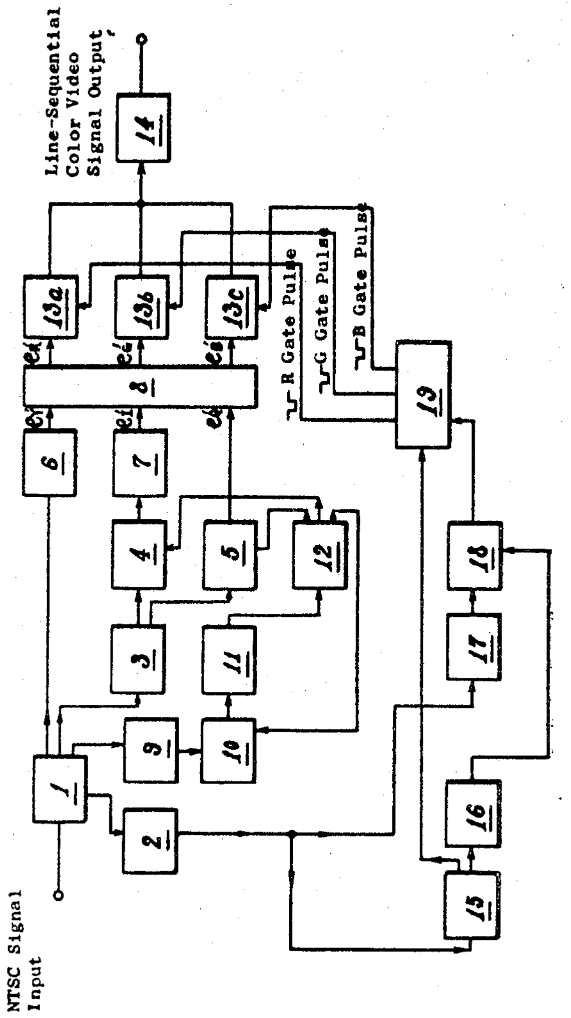
FIG. 4 is a block diagram illustrating the transducer unit.

The transducer unit is shown in the block diagram of FIG. 4 a comprising a video amplifier 1, a synchronizing signal separator 2, a chrominance signal amplifier 3, an I-signal demodulator 4, a Q-signal demodulator 5, a luminance signal delay circuit 6, an I-signal delay circuit 7, a matrix circuit 8, a burst signal separator 9, a phase discriminator 10, a subcarrier oscillator 11, a subcarrier amplifier and phase shifter 12, a gate circuit 13, an output amplifier 14, a horizontal oscillator 15, a one-shot multivibrator 16, an integration circuit 17, an AND-gate circuit 18, and a gate signal generator 19.

The integration circuit 17 and the AND-gate circuit 18 are adapted to cooperate in extracting odd-number pulses from the vertical synchronizing signal.

The NTSC signal is applied to the video amplifier 1, while the luminance component *e*Y′ thereof is given a delay in time by the luminance signal delay circuit 6 and applied to the matrix circuit 8. The output of the video amplifier 1 is also supplied to the synchronizing signal separator 2 wherein the synchronizing signal is separated from the composite video signal. The video amplifier output is further supplied to the chrominance signal amplifier 3 and to the burst signal separator 9. The subcarrier oscillator 11 is adapted to develop a subcarrier controlled by the burst signal at the phase discriminator 10. The subcarrier is supplied through the subcarrier amplifier and phase shifter circuit 12 to the I-signal demodulator 4 and Q-signal demodulator 5, wherein the chrominance signal components from the chrominance signal amplifier 3 are demodulated to produce an I-signal (*e*I′) and a Q-signal (*e*Q′), respectively.

The I-signal and Q-signal which have been delayed through the I-signal delay circuit 7 are combined with the luminance signal (*e*Y′) in appropriate amplitude and polarity at the matrix circuit 8 to be translated into the primary color signals representing red, green and blue.

The circuit arrangements just mentioned are well known as being substantially similar to decoders in the NTSC system or primary color demodulation circuits in commercially available television receivers and hence, will require no further description.

In accordance with the present invention, the synchronization of the primary color signals transmitted with those received is accomplished by utilizing the leading edge of a vertical synchronizing pulse to index a specific scanning line for a specific one of the three primary color components. The leading edge of this vertical synchronizing pulse may be sampled by means of the following circuit operations. For the sake of convenience, the term "leading edge of an odd-number vertical synchronizing pulse" will be hereinafter referred to simply as "odd-number pulse."

Figure 5:
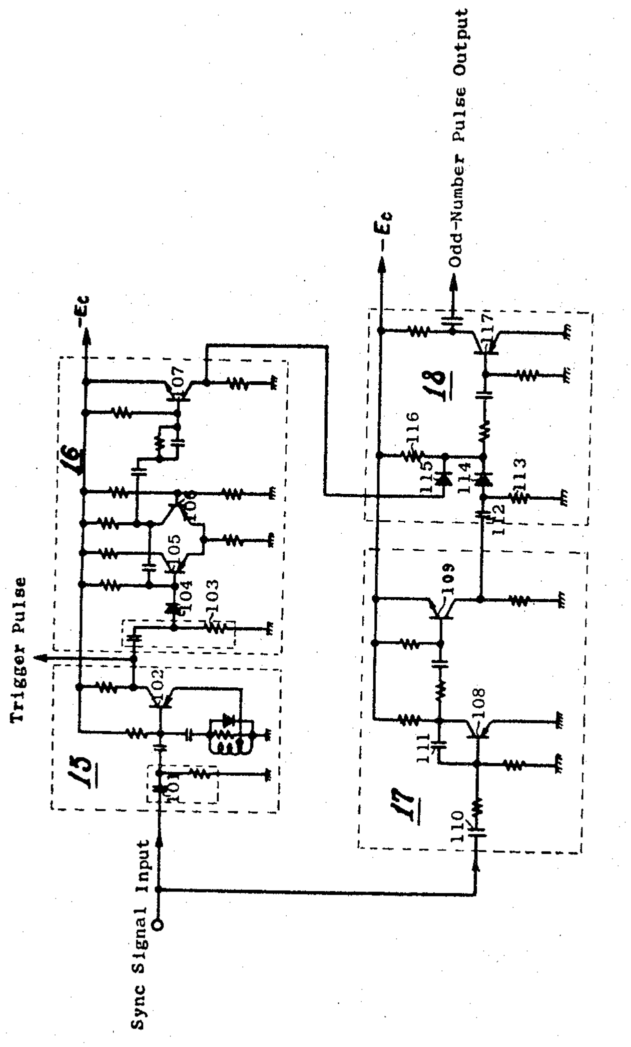
FIG. 5 is a circuit diagram illustrating a horizontal oscillator, a one-shot multivibrator, an integration circuit and an AND-gate circuit.

The horizontal oscillator 15 shown schematically in FIG. 4 and specifically in FIG. 5 is a Hartley type blocking oscillator which synchronizes with the horizontal synchronizing pulse. This oscillator begins to oscillate in synchronism with the horizontal synchronizing pulse as the composite synchronizing signal separated from the composite video signal is supplied through the integration circuit 101 to the base of transistor 102. The equalizing pulse and the vertical synchronizing pulse, each having a frequency twice as high as the frequency of a horizontal synchronizing pulse, will cause the blocking oscillator to synchronize for every two pulses so that its oscillation output remains the same as if it were synchronized with the horizontal synchronizing pulse. Consequently, the output of the blocking oscillator is such that it is free of the horizontal synchronizing component of the composite synchronizing signal (FIG. 6*a–a′*). The waveform of this oscillator output is shown at FIG. 6*b–b′*. The operation and frequency-dividing action of the above blocking oscillator are well known and hence, will require no further description.

The output of the blocking oscillator is derived as a positive pulse from the collector of transistor 102, said positive pulse being supplied through an integration circuit 103 and a diode 104 and utilized to trigger a one-shot multivibrator consisting of transistor 105 and 106.

The one-shot multivibrator commonly known for determining the pulse width is utilized to develop a horizontal synchronizing pulse having a width sufficient to gate the odd-number pulse as will be more fully described later. The positive pulse developed at the collector of transistor 106 is amplified and shaped by a pulse amplifier 107 to develop a negative pulse such as shown at FIG. 6*c–c′*. The pulse amplifier 107 is adapted to be energized only when a positive pulse is applied thereto. The transistor 107 becomes saturated as a sufficiently large positive pulse is applied to its base, thereby obtaining a shaped negative pulse.

The composite synchronizing signal is integrated by the integration circuit 17 or a Miller integrator formed with a transistor 108, a resistor 110 and a condenser 111, wherein the horizontal synchronizing pulse is attenuated while the vertical synchronizing pulse is obtained at the collector of transistor 108. Since the horizontal synchronizing component has not been completely attenuated, the vertical synchronizing pulse appearing at the collector of transistor 108 is further shaped by a pulse amplifier or transistor 109 thereby developing a negative vertical synchronizing pulse such as shown at FIG. 6*d–d'*.

It will be appreciated that the vertical synchronizing pulse having passed through the Miller integrator 17 will have its leading edge delayed for about 6 microseconds as illustrated at FIG. 6*d–d'*. Since the Miller integrator and the pulse amplifiers are well known in the art, no further description thereof will be required.

The AND-gate circuit 18 comprises a diode 114, a diode 115 and a transistor 117 and has a plurality of input terminals and one output terminal. This circuit is characterized in that a pulse appears on the output terminal only when all of the input terminals are supplied with pulses. The gate circuit used in the transducer unit according to the present invention has two input terminals at the positive poles of the two diodes and an output terminal at the negative poles thereof. A transistor 117 is adapted to compensate for loss in this diode AND-circuit.

To the input terminal of the diode 115 is supplied a negative pulse having a width of about 10 microseconds from the collector of transistor 107. To the input terminal of the diode 114 is supplied a vertical synchronizing pulse through a differentiation circuit consisting of a condenser 112 and a resistor 113. This vertical synchronizing pulse (FIG. 6*d–d'*), when passing through the differentiation circuit, appears like a differentiated waveform with its leading edge changed to negative as shown at FIG. 6*e–e'*.

While in the absence of negative pulses at the two input terminals and with the impedance of the signal source held sufficiently low compared with the resistor 116, the two diodes are conducting and their output terminal voltages turn close to zero. Now, with the negative pulse applied to the positive pole of either of the two diodes, this diode having received the negative pulse is inversely biased and placed in a cut-off condition. However, since the other diode is conducting, the output terminal voltage still remains close to zero. As the negative pulse is finally applied to both input terminals, both of these two diodes are brought into a cut-off state and their common output terminal is held at a negative potential so that the negative odd-number pulse has appeared at the output terminal. This odd-number pulse is subjected to shaping by a transistor pulse amplifier 117 to turn into a positive odd-number pulse such as shown at FIG. 6*f–f'*.

The reason for the horizontal synchronizing pulse width being increased to about 10 microseconds by the multivibrator 16 is that it is necessary to position the odd-number pulse which is delayed about 6 microseconds in the vicinity of the center of the horizontal synchronizing pulse thereby effecting a complete gating.

The ring counter circuit shown in FIG. 7 comprises three flip-flop circuits 118–120 connected annularly by condensers 131–133. The diode 121 connected between the odd-number pulse input terminal and ground is held in a conducting state while the odd-number pulse is not applied thereto.

Assuming that the transistor on the right of the flip-flop 118 is in OFF position and the transistors 124 and 126 on the left of the other two flip-flop circuits 119 and 120 are in OFF position, it will be appreciated that all the remaining transistors are held in ON position. On application to this circuit of the positive trigger pulse from the horizontal oscillator through the trigger input terminal, the left-hand side transistors are switched to off and the right-hand side transistors to on. These transistor positions are reversed when a negative pulse is applied. The transistor 123 is switched to ON position when a positive trigger pulse is applied through condenser 128, while the transistors 125 and 127, to which the trigger pulse is applied through condensers 129 and 130, continue to hold their ON position. As the transistor 123 is switched to ON position, the positive pulse appearing at the collector thereof is supplied through condenser 131 to the collector of transistor 124. This positive pulse causes the transistor 124 to switch to ON position and the transistor 125 to OFF position, whereupon the negative pulse is applied through condenser 132 to the collector of transistor 126 which continues to be in OFF position until the next horizontal synchronizing pulse is applied. Thus, the state of the flip-flop 118 is shifted to the flip-flop 119 when the horizontal synchronizing pulse is applied. In like manner, with the next horizontal synchronizing pulse applied to the ring counter circuit, the state of the flip-flop 119 is shifted to the flip-flop 120. The ring counter circuit switches between the ON and OFF positions, i.e. goes into flip-flop action upon application thereto of a trigger pulse.

FIG. 8 shows the waveforms of collector outputs of the transistors on the right-hand side of the flip-flop circuit. As apparent from this waveform diagram, the flip-flop with its right transistor held in OFF position develops a gate pulse. The outputs of flip-flop circuits 118–120 are designated to be R gate pulse, G gate pulse and B gate pulse, respectively, for purposes of illustration.

As already described, the R or red gate pulse appears on the flip-flop 118 when the transistor 123 of flip-flop 118, the transistor 124 of flip-flop 119 and the transistor on the right of flip-flop 120 are set in OFF position. It follows that the ON and OFF positions of these transistors may be reset with the odd-number pulse so as to enable the synchronization of primary color signals at the transmitter and at the receiver. As a positive odd-number pulse is supplied from the odd-number pulse input terminal to the collector of transistor 118 in the AND-gate circuit 18, the diode 121 is switched into a cut-off state and the positive odd-number pulse is applied through resistors 134–136 to the base of each of transistors 123, 124 and 126, whereupon these three transistors are switched into an OFF state, and this circuit state continues until the subsequent horizontal synchronizing pulse is applied.

Thus, it is possible according to the present invention to obtain such gate pulses which are synchronized by the odd-number pulse from the ring counter circuit.

FIG. 9 shows the circuit arrangements of the gate pulse 13 and the output amplifier circuit. The gate circuit 13 comprises a gate 13*a* for red signal, a gate 13*b* for green signal and a gate 13*c* for blue signal. For purposes of illustration, the gate 13*a* alone will be considered because all of these three gate circuits are identical. The transistor 201 is an emitter-follower; the diode 202 is a DC reproduce diode; the transistor 203 is a switching transistor, and the transistor 204 is an emitter-follower. The positive red color signal $eG'$ (see FIG. 10) from the matrix circuit is applied to the base of transistor 201 and converted by the emitter-follower into a low output impedance for application to the diode 202 wherein the synchronizing signal is set to the value of —E and thereafter, it is applied to the base of transistor 204.

To the base of transistor 203 is applied the negative gate pulse (see FIG. 10*b*) from the ring counter circuit. This transistor conducts between its emitter and collector upon application of the negative pulse to its base, as this is required to keep a potential of the collector or transistor 204. As the transistor 204 is thus energized only when the negative pulse is applied to the base of transistor 203, the red signal $eG'$ appears at the emitter of transistor 204 for the duration of 1H, i.e. as long as the gate pulse is applied thereto, and the emitter voltage is nil during the other 2H period.

Similar results may be obtained with the green and blue color signals as will be apparent from FIG. 10–*def* and *ghi*, respectively. FIG. 10–*j* shows the waveform which comprises a combination of video signals derived from the respective gate circuits. The composite signal is a line-sequential color signal including red, green and blue components in the order named. This line-sequential video signal is applied to the output amplifier circuit 14 where it is amplified by two grounded-emitter transistors 205 and 206 for application to a low output impedance circuit comprising transistors 207 and 208.

The output of the low output impedance circuit is a line-sequential type of video signal including red, green and blue color components in that order with the red signal indexed at the first scanning line.

*Monitor circuit*

FIG. 11 shows the monitoring circuit or television receiver unit according to the present invention which is utilized for the reproduction of the line-sequential color video signal supplied from the magnetic recording unit (not illustrated). The video signal is supplied through the input terminal of the monitor to a video amplifier 30 for application to the cathode of a picture tube. The video signal is also supplied to a synchronizing signal separator 31 wherein the synchronizing components are separated from the video signal. The synchronizing signal is supplied to a horizontal oscillation and deflection circuit 32 and to a vertical oscillation and deflection circuit 33 thereby energizing the deflection coil 41. These circuit arrangements and operations are substantially the same as those used in a conventional television receiver, and hence will require no further description.

The monitoring circuit according to the present invention will now be considered with particular reference to a single electron gun type of picture tube having a control grid structure.

The video signal applied to the cathode K of the picture tube 34 is line-sequential; therefore, it is necessary to apply a stepped-waveform to the control grid 40 in the picture tube 34. This stepped-waveform is obtained by combining at a stepped-waveform forming circuit 38 the square waves which have been generated by a ring counter 37. As this stepped-waveform is applied to the control grid 40, the three primary colors are switched sequentially for each scanning line. The pulse amplifier 35 is adapted to amplify and shape the horizontal deflection drive pulse from the horizontal oscillation and deflection circuit 32 for application to an odd-number pulse sampling circuit 36 hereinafter described. The thus shaped pulse is inverted in polarity for energizing the ring counter.

The odd-number pulse sampling circuit 36 is adapted to detect an odd-number pulse from the synchronizing signal supplied by the synchronizing signal separator 31 thereby resetting the ring counter. The odd-number pulse sampling circuit 36 and the ring counter circuit 37 are included in the transducer unit above described for converting the NTSC signal into a line-sequential type of video signal, and hence will require no further explanation.

The pulse amplifier 35 receives a positive horizontal deflection drive pulse from the horizontal oscillation and deflection circuit 32 and supplies same through a coupling condenser to the base of transistor 42. This transistor amplifier becomes saturated upon reception of sufficient input pulse, and the waveform appearing at its collector is shaped to be a negative pulse. The horizontal deflection drive pulse has a pulse width wider than the horizontal synchronizing signal but substantially equal to that of the waveform of the output of the one-shot multivibrator used in the transducer unit, so that the collector output of transistor 42 may be applied as it is to the AND-gate circuit **36*b* in the odd-number pulse sampling circuit 36**.

The collector output of transistor 42 is also applied to the base of transistor 43 which operates when its base is held at negative potential, while a positive pulse is developed at its collector. This positive pulse is applied as a trigger pulse to the ring counter 37 to energize the same. The stepped-waveform generator 38 supplies a negative square wave having a pulse width corresponding to 1H and a cycle corresponding to 3H and a negative square wave having a pulse width with 1H phase behind the first negative square wave and a cycle corresponding to 3H. These square waves are applied to transistors 44 and 46, respectively. These transistors are known as a grounded-emitter circuit and connected with drive transformers 45 and 46, respectively. Transistors 48 and 49 form a push-pull amplifier circuit driven with regulated voltage from the drive transformers 45 and 46. To the base of each of transistors 48 and 49 is applied a negative square wave. The output transformer 50 is conected at one end of its primary coil with the collector of transistor 48 and at the other end with the collector of transistor 49, these transistors being supplied with a DC voltage as shown.

The two square waves above described are combined at the output transformer 50 thereby developing the desired stepped-waveform. The stepped-waveform developed at the secondary coil of the output transformer is superimposed upon the control voltage for the picture tube obtained from the high-voltage circuit 39. This superimposed voltage is applied to the control grid 40 of the picture tube to control the electron beam.

The high-voltage circuit 39 just mentioned may be such circuit utilizing a flyback pulse like that used in a conventional television receiver.

While there have been described and illustrated what are at present considered to be the preferred embodiments of this present invention, it will be obvious to those skilled in the art that various changes and modifications may be made therein without departing from the present invention. For example, the odd-number pulse herein above referred to as being sampled for indexing the scanning line for a specific one of the three primary color signals may be an even-number pulse in effect which will give similar results.

What is claimed is:

1. In color signal synchronizing apparatus for use in a line sequential color television system, means for sampling a pulse signal corresponding to the leading edge of a vertical synchronizing pulse, a color switching circuit adapted to reproduce a predetermined color, said color switching circuit comprising means for producing a three-stepped wave form of each of the three different color signals respectively sequentially, and means for shifting said three-stepped wave form by said pulse signals to change the color switching sequence.

2. In color signal synchronizing apparatus for use in a line sequential color television system, means for sampling a pulse signal corresponding to the leading edge of a vertical synchronizing pulse, a bi-stable multivibrator for sampling said pulse signal corresponding to the leading edge of a vertical synchronizing pulse in an even-number field by application of vertical and horizontal synchronizing pulses to the set and reset inputs, respectively, of said bi-stable multivibrator, a color switching circuit adapted to reproduce a predetermined color, said color switching circuit comprising means for producing a three-stepped wave form of each of the three different color signals respectively sequentially, and means for shifting said three-stepped wave form by said pulse signals to change the color switching sequence.

3. In field sensing apparatus for use in a line sequential color television system, means for sampling a pulse signal corresponding to the leading edge of a vertical synchronizing pulse, a mono-stable multivibrator for increasing the pulse width of a horizontal synchronizing pulse an AND-gate circuit to which the horizontal synchronizing pulse having pulse width increased by said mono-stable multivibrator and a pulse signal corresponding to the leading edge of said vertical synchronizing pulse are applied, means for sampling the pulse signal corresponding to the leading edge of the said vertical synchronizing pulse in an odd-number field from said AND-gate circuit, a color switching circuit adapted to reproduce a predetermined color, said color switching circuit comprising means for producing a three-stepped wave form of each of the three different color signals respectively sequentially, and means for shifting said three-stepped wave form by said pulse signals to change the color switching sequence.

References Cited

UNITED STATES PATENTS

| | | | |
|---|---|---|---|
| 2,739,181 | 3/1956 | Sleeper et al. ---------- | 178—5.2 |
| 2,742,523 | 4/1956 | Preisig et al. ---------- | 178—5.4 |

ROBERT L. GRIFFIN, *Primary Examiner.*

R. MURRAY, *Assistant Examiner.*

U.S. Cl. X.R.

178—69.5